(12) United States Patent
DiMascio

(10) Patent No.: US 7,241,435 B2
(45) Date of Patent: Jul. 10, 2007

(54) SYSTEM AND PROCESS FOR PRODUCING HALOGEN OXIDES

(75) Inventor: Felice DiMascio, Rocky Hill, CT (US)

(73) Assignee: Halox Technologies, Inc., Bridgeport, CT (US)

( * ) Notice: Subject to any disclaimer, the term of this patent is extended or adjusted under 35 U.S.C. 154(b) by 0 days.

(21) Appl. No.: 11/042,287

(22) Filed: Jan. 25, 2005

(65) Prior Publication Data

US 2005/0163700 A1 Jul. 28, 2005

Related U.S. Application Data

(63) Continuation-in-part of application No. 10/065,259, filed on Sep. 30, 2002, now Pat. No. 6,913,741.

(51) Int. Cl.
C01B 11/02 (2006.01)

(52) U.S. Cl. .................. 423/477; 423/462; 423/472

(58) Field of Classification Search ............. 423/477, 423/472, 475, 462; 252/187.1, 187.21, 187.23
See application file for complete search history.

(56) References Cited

U.S. PATENT DOCUMENTS

| | | | |
|---|---|---|---|
| 2,717,237 A | 9/1955 | Rempel | |
| 3,386,915 A | 6/1968 | Butschl et al. | |
| 3,684,437 A | 8/1972 | Callerame | |
| 3,763,006 A | 10/1973 | Callerame | |
| 3,878,072 A | 4/1975 | Cook, Jr. et al. | |
| 3,884,777 A | 5/1975 | Harke et al. | |
| 3,904,496 A | 9/1975 | Harke et al. | |
| 4,032,452 A | 6/1977 | Davis | |
| 4,115,217 A | 9/1978 | Larsson et al. | |
| 4,234,446 A | 11/1980 | Ramras | |
| 4,250,144 A | 2/1981 | Ratigan | |
| 4,308,117 A | 12/1981 | Sweeney | |
| 4,362,707 A | 12/1982 | Hardee et al. | |
| 4,381,290 A | 4/1983 | Hardee et al. | |
| 4,426,263 A | 1/1984 | Hardee et al. | |
| 4,432,856 A | 2/1984 | Murakami et al. | |
| 4,526,904 A | 7/1985 | Kishida et al. | |
| 4,542,008 A | 9/1985 | Capuano et al. | |
| 4,632,876 A | 12/1986 | Laird et al. | |
| 4,683,039 A | 7/1987 | Twardowski et al. | |
| 4,725,390 A | 2/1988 | Laird et al. | |
| 4,767,510 A | 8/1988 | Lipsztajn | |
| 4,806,215 A | 2/1989 | Twardowski et al. | |
| 4,853,096 A | 8/1989 | Lipsztajn et al. | |
| 5,008,096 A | 4/1991 | Ringo | |
| 5,041,196 A | 8/1991 | Cawlfield et al. | |
| 5,077,258 A | 12/1991 | Phillips et al. | |
| 5,078,908 A | 1/1992 | Ripley et al. | |
| 5,084,149 A | 1/1992 | Kaczur et al. | |

(Continued)

OTHER PUBLICATIONS

U.S. Appl. No. 60/613,541, filed Sep. 27, 2004 (19 pgs).

*Primary Examiner*—Ngoc-Yen Nguyen
(74) *Attorney, Agent, or Firm*—Cantor Colburn LLP

(57) ABSTRACT

A system and process for oxidizing inorganic or organic species is disclosed. The system and process includes mixing a dilute aqueous alkali metal halite solution with a mixture of protic acids to produce an effluent containing a halous acid; and contacting the effluent containing the halous acid with a catalytic material to produce a halogen oxide.

13 Claims, 8 Drawing Sheets

U.S. PATENT DOCUMENTS

| | | |
|---|---|---|
| 5,092,970 A | 3/1992 | Kaczur et al. |
| 5,100,652 A * | 3/1992 | Kross et al. .................. 424/53 |
| 5,106,465 A | 4/1992 | Kaczur et al. |
| 5,158,658 A | 10/1992 | Cawlfield et al. |
| 5,185,161 A | 2/1993 | Davidson et al. |
| 5,242,552 A | 9/1993 | Coin et al. |
| 5,242,553 A | 9/1993 | Kaczur et al. |
| 5,248,397 A | 9/1993 | Cawlfield et al. |
| 5,264,089 A | 11/1993 | Kaczur et al. |
| 5,296,108 A | 3/1994 | Kaczur et al. |
| 5,312,978 A * | 5/1994 | Mori et al. ................. 562/510 |
| 5,348,659 A | 9/1994 | Kunz et al. |
| 5,354,435 A | 10/1994 | Kaczur et al. |
| 5,389,390 A * | 2/1995 | Kross ........................ 426/332 |
| 5,391,533 A | 2/1995 | Peterson et al. |
| 5,419,816 A | 5/1995 | Sampson et al. |
| 5,435,984 A | 7/1995 | Daly et al. |
| 5,609,742 A | 3/1997 | Sampson et al. |
| 5,651,996 A * | 7/1997 | Roozdar ..................... 424/665 |
| 6,284,152 B1 * | 9/2001 | Kross .................... 252/187.21 |
| 6,740,223 B2 | 5/2004 | Lipsztajn et al. |
| 2003/0006144 A1 | 1/2003 | Tremblay et al. |
| 2003/0064018 A1 | 4/2003 | Sampson et al. |

\* cited by examiner

SYSTEM AND PROCESS FOR PRODUCING
HALOGEN OXIDES

CROSS REFERENCE TO RELATED
APPLICATIONS

This application is a continuation-in-part of, and claims priority to, U.S. patent application Ser. No. 10/065,259, filed Sep. 30, 2002 now U.S. Pat. No. 6,913,741, incorporated herein by reference in its entirety.

BACKGROUND

This disclosure relates generally to a system and process for producing halogen oxides and more particularly, to a system and process for producing halogen oxides from an alkali metal halite.

With the decline of gaseous chlorine as a microbiocide and bleaching agent, various alternatives have been explored, including bleach, bleach with bromide, bromochlorodimethyl hydantoin, ozone, and chlorine dioxide ($ClO_2$). Of these, chlorine dioxide has generated a great deal of interest for control of microbiological growth in a number of different industries, including the dairy industry, the food and beverage industry, the pulp and paper industries, the fruit and vegetable processing industries, various canning plants, the poultry industry, the beef processing industry and miscellaneous other food processing applications. Chlorine dioxide is also seeing increased use in municipal potable water treatment facilities, potable water pathogen control in office building and healthcare facilities, industrial cooling loops, and in industrial waste treatment facilities, because of its selectivity towards specific environmentally-objectionable waste materials, including phenols, sulfides, cyanides, thiosulfates, and mercaptans. In addition, chlorine dioxide is being used in the oil and gas industry for downhole applications as a well stimulation enhancement additive.

Unlike chlorine, chlorine dioxide remains a gas when dissolved in aqueous solutions and does not ionize to form weak acids. This property is at least partly responsible for the biocidal effectiveness of chlorine dioxide over a wide pH range, and makes it a logical choice for systems that operate at alkaline pHs or that have poor pH control. Moreover, chlorine dioxide is a highly effective microbiocide at concentrations as low as 0.1 parts per million (ppm) over a wide pH range.

The biocidal activity of chlorine dioxide is believed to be due to its ability to penetrate bacterial cell walls and react with essential amino acids within the cell cytoplasm to disrupt cell metabolism. This mechanism is more efficient than other oxidizers that "burn" on contact and is highly effective against legionella, algae and amoebal cysts, giardia cysts, coliforms, salmonella, shigella, and cryptosporidium.

Unfortunately, chlorine dioxide can become unstable and hazardous under certain temperature and pressure conditions. Although this is only an issue of concern for solutions of relatively high concentration, its shipment, at any concentration, is banned. It is for this reason that chlorine dioxide is always generated on-site, at the point of use, usually from a metal chlorate or metal chlorite as an aqueous solution.

SUMMARY

Disclosed herein is a process for producing a halogen oxide. The process comprises mixing a dilute aqueous alkali metal halite solution with a mixture of protic acids to produce an effluent containing a halous acid, and contacting the effluent containing the halous acid with a catalytic material to produce the halogen oxide.

In another embodiment, a process for producing chlorine dioxide comprises mixing a dilute alkali metal chlorite solution with a mixture of protic acids to produce an effluent containing a chlorous acid, wherein the mixture of protic acids does not comprise a halide-containing acid, and wherein the mixture of protic acids comprises a sulfur-containing protic acid and a phosphorus-containing protic acid; and contacting the effluent containing the chlorous acid with a catalytic material to produce the chlorine dioxide.

The above-described embodiments and other features will become better understood from the detailed description that is described in conjunction with the accompanying drawings.

BRIEF DESCRIPTION OF THE DRAWINGS

Referring now to the figures wherein the like elements are numbered alike.

DETAILED DESCRIPTION

Point of use systems and processes for producing halogen oxide from alkali metal halite solutions are disclosed, such as, for example, systems and processes for producing chlorine dioxide from an alkali metal chlorite solution. The systems and processes generally include employing a chamber or column, such as a cation exchange column or an acidification column, for producing an aqueous effluent containing halous acid from the alkali metal halite solution, which is then fed to a catalytic reactor for converting the halous acid to halogen oxide. In a preferred embodiment, the alkali metal halite is an alkali metal chlorite and is employed for producing an aqueous effluent containing chlorine dioxide.

In a more preferred embodiment, the alkali halite solutions are dilute solutions. The term "dilute" refers to aqueous alkali metal halite solutions containing less than about 10,000 milligrams alkali metal halite per liter of solution (mg/L), preferably less than about 5,000 mg/L, and more preferably less than about 1,500 mg/L. For industrial use, the alkali metal halite solution is preferably in the form of a 25% aqueous solution in view of handling property, safety and the like, which can be further diluted during use. Suitable alkali metals include sodium, potassium, lithium, and the like, with preference given to sodium salt considering the commercial availability.

Figure 1:
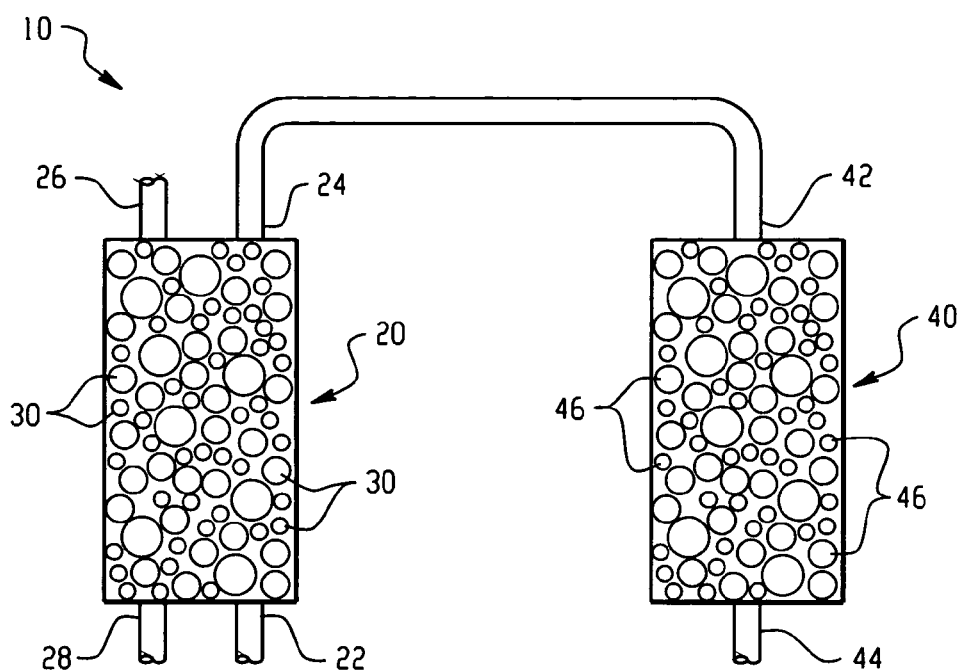
FIG. 1 shows a cross sectional view illustrating a system comprising a cation exchange column, and a catalytic reactor.

Referring now to FIG. 1, wherein like elements are numbered alike, there is shown a cross-sectional view illustrating a system 10 that generally comprises a cation exchange column 20, and a catalyst reactor 40. The cation exchange column 20 includes an inlet 22 and an outlet 24, wherein the outlet 24 is in fluid communication with an inlet 42 of the catalytic reactor 40. As will be discussed in greater detail, the system 10 can be utilized for generating an aqueous effluent containing halogen oxide from an outlet 44 of the catalytic reactor 40. For example, an alkali metal chlorite solution can be fed into the inlet 22 of the cation exchange column 20 to discharge an aqueous effluent containing chlorous acid from outlet 24. The chlorous acid effluent can then be fed to inlet 42 of the catalytic reactor 40, wherein the chlorous acid is reacted with a catalytic material 46 disposed therein to form and produce an aqueous effluent containing chlorine dioxide from the outlet 44. In this manner, it has been found that high conversion efficiencies of chlorite ions to chlorine dioxide can be achieved.

The cation exchange column 20 contains a cation exchange material 30. The cation exchange material 30 is preferably an oxidizing exchanger, i.e., a cation ion exchange resin or material. Any cation exchange material 30 can be used provided portions of its active sites are occupied with hydrogen, i.e., cation exchange material in the hydrogen form. During operation of the cation exchange column 20, a function of the cation exchange material 30 includes, among others, exchanging or adsorbing alkali metal ions from a dilute aqueous alkali metal halite solution and releasing hydrogen ions. The released hydrogen ions react with the halite ions to form a halous acid. Due to the natural selectivity of the cation exchange material 30, contacting the alkali metal chlorite solution advantageously produces a substantially pure aqueous chlorous acid solution.

When the cation exchange material 30 reaches its exhaustion point or is near exhaustion, it may be readily regenerated by a strong or weak acid so as to exchange the alkali or alkaline earth metal previously adsorbed onto the active sites of the cation exchange material 30 for hydrogen ions. Regeneration of the cation exchange column can be in either a co-current flow direction or a counter-current flow direction relative to the normal operating flow direction through the cation exchange column, or alternatively, may be pulsed. Suitable regeneration processes and process parameters are disclosed in U.S. Pat. No. 5,348,659 to Kunz et al, incorporated herein by reference in its entirety. Preferably, a backwashing step precedes regeneration so as to remove any particulate matter that may have been in solution during operation of system 10. Following regeneration, the cation exchange material 30 is preferably rinsed substantially free of excess regenerant prior to operating the column in the manner previously described.

Figure 2:
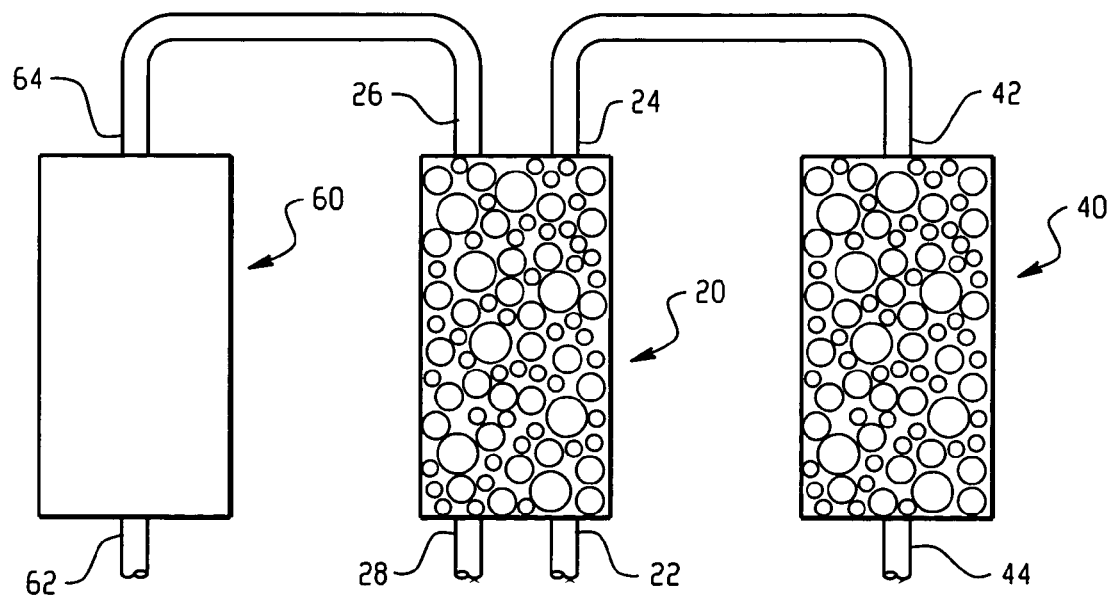
FIG. 2 shows a cross sectional view illustrating a system comprising an electrolytic reactor, a cation exchange column, and a catalytic reactor.
Figure 7:
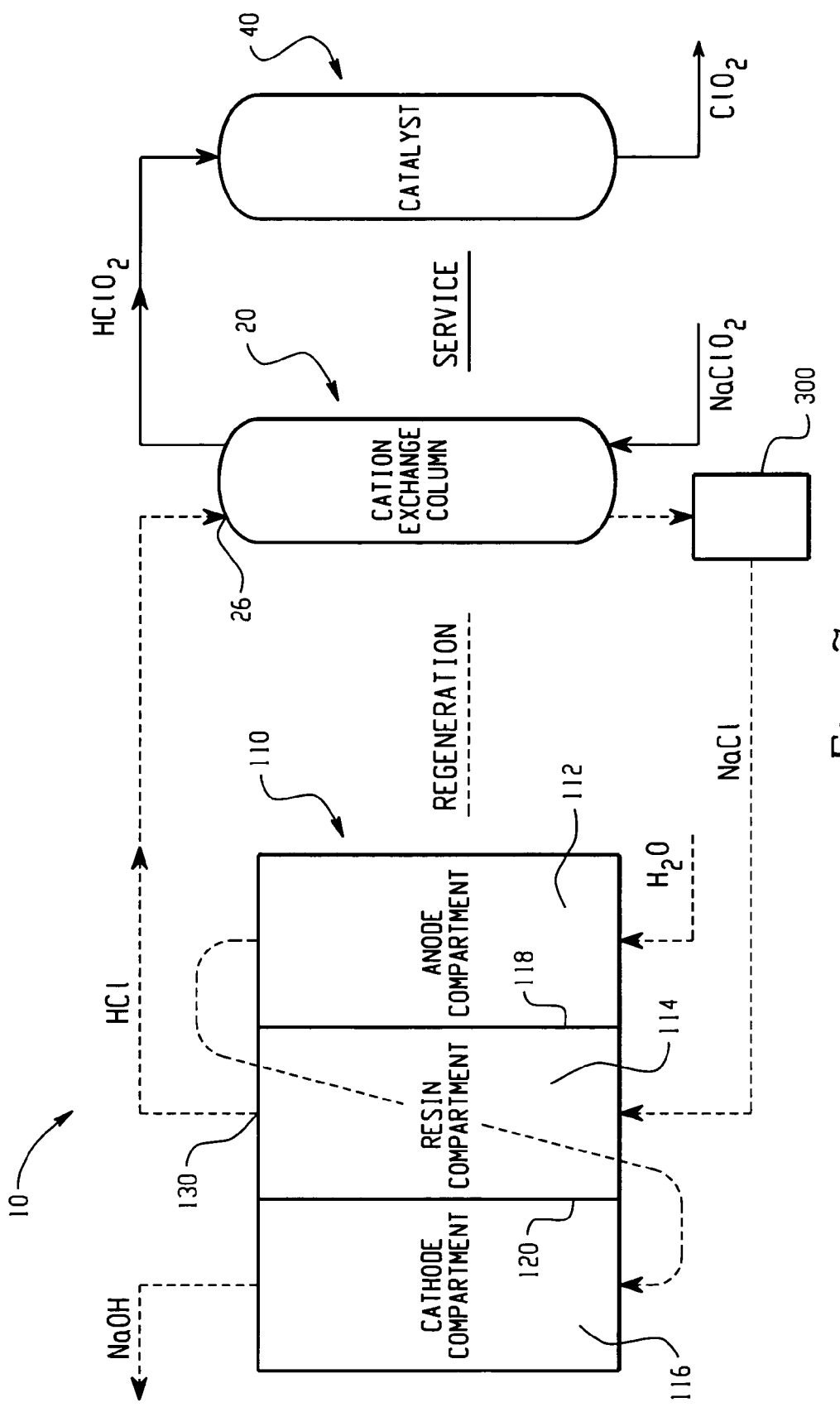
FIG. 7 shows a cross sectional view illustrating the system in accordance with one embodiment.

The acid necessary for regenerating the cation exchange material 30 is preferably added to the cation exchange column 20 in a direction countercurrent to the normal flow direction that occurs during operation, i.e., the acid solution is fed into the cation exchange column outlet 24 and exits the inlet 22. Alternatively, the acid may be added in a direction similar to the normal flow operation. Optionally, a separate outlet 26 and/or separate inlet 28 may be employed for regenerating the cation exchange material 30. In one embodiment, the regenerant is a strong or weak acid that is contained within a regenerant (i.e., protic acid) storage tank at the system point of use and is added directly to the cation exchange column 20. In another embodiment, as shown in FIG. 2, the regenerant is generated electrolytically in an electrolytic reactor 60, which is then fed into the cation exchange column 20 during regeneration or to the protic acid storage tank for regeneration at a later time. In the embodiment shown in FIG. 2, an acid precursor is fed to inlet 62 of the reactor 60, wherein a protic acid is generated from the acid precursor and discharged though outlet 64, which is in fluid communication with the cation exchange column 20. Preferably, the acid precursor is fed at a concentration of about 4 to about 10 percent by weight. Preferably, a flow rate of the protic acid into the cation exchange column to effect regeneration, from electrolysis or otherwise, is at about 0.05 to about 0.1 bed volumes per minute. The term "bed volume" (BV) refers to the spatial volume of cation exchange material 30 including the void spaces or interstices between particles of the cation exchange material 30. Upon feeding the protic acid to the cation exchange column 20, the cation exchange material 30 is regenerated. The effluent passing through the cation exchange column 20 is preferably collected in a regeneration effluent storage tank 300 (as shown in FIG. 7) for use in the next regeneration cycle. It should be noted that the regeneration effluent discharged from the cation exchange column 20 contains an acid precursor suitable for use in the electrolytic reactor since regeneration of the cation exchange material 30 will cause desorption of the adsorbed alkali metal ions. Thus, the effluent will contain the desorbed alkali metal ions and the acid precursor anions, i.e., the effluent contains the acid precursor. As such, treatment, i.e., disposal, of the effluent is not required. The system 10 also includes a computer-processing unit (not shown), which is programmed to control the sequence of operation and regeneration.

Examples of suitable cation exchange materials 30 include, but are not intended to be limited to, polystyrene divinylbenzene cross-linked cation exchangers (e.g., strong acid types, weak acid types, iminodiacetic acid types, chelating selective cation exchangers and the like); strong acid perfluorosulfonated cation exchangers, e.g., NR40 and NR50 commercially available from E.I. duPont de Nemours, Wilmington, Del.; naturally occurring cation exchangers, such as manganese greensand; high surface area macro-reticular or microporous type ion exchange resins having sufficient ion conductivity; and the like. In a preferred embodiment, the cation exchange materials have a cross-linking density greater than about 8%, with greater than about 12% more preferred, with greater than about 16% even more preferred with greater than 25% most preferred. Increasing the cross-linking density of the cation exchange materials has been found to increase the resistance of the cation exchange materials to potentially deleterious effects such as oxidation and degradation. As a result, operating lifetimes for the cation exchange column can advantageously be extended. Suitable cation exchange resins for the cation exchange column includes Relite EXC04 commercially available form the Mitsubishi Chemical Corporation having a crosslinking density greater than 50% and a total ion exchange capacity of 1.2 equivalents per liter, Diaion HPK25 commercially available from the Mitsubishi Chemical Corporation having a crosslinking density of about 25% and a total ion exchange capacity of 1.7 equivalents per liter, Diaion PK228 commercially available from the Mitsubishi Chemical Corporation having a crosslinking density of about 14% and a total ion exchange capacity of 2.05 equivalents per liter, and Diaion SK116 commercially available from the Mitsubishi Chemical Corporation having a crosslinking density of about 16% and a total ion exchange capacity of 2.10 equivalents per liter.

Liquid is preferably employed to transfer cation exchange resin to the column. The column itself should preferably contain some liquid at the start of the operation, and the cation exchange resin should be poured into the column as a liquid slurry. Dry cation exchange resin should preferably be fully hydrated before introduction into the column, since the swelling pressures created when the resin absorbs liquid may cause damage to the column. The column is preferably loaded to less than the full volume of the column. In a preferred embodiment, the resin loading is at about 50 to about 80 percent of the column volume.

Figure 8:
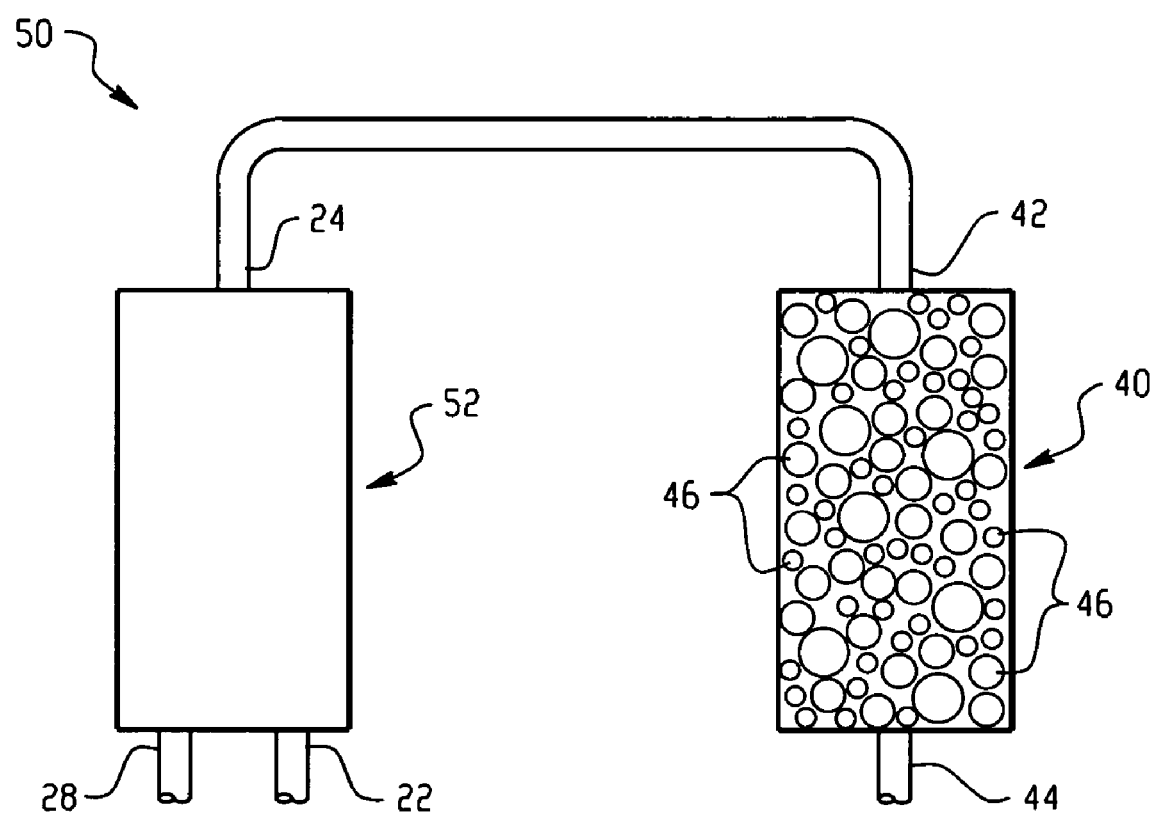
FIG. 8 shows a cross sectional view illustrating a system comprising an acidification column and a catalytic reactor.

In accordance with another embodiment, FIG. 8 shows a cross-sectional view of a system 50 that generally comprises an acidification column 52 and a catalyst reactor 40. The acidification column 52 comprises an inlet 22 and an outlet 24, wherein the acidification column outlet 24 is in fluid communication with an inlet 42 of the catalytic reactor 40. As will be discussed in greater detail, the system 50 may be utilized for generating an aqueous effluent containing halogen oxide from an outlet 44 of the catalytic reactor 40. For example, an alkali metal chlorite solution may be fed into the inlet 22 of the acidification column 52 to discharge an aqueous effluent containing chlorous acid from outlet 24. The chlorous acid effluent may then be fed to inlet 42 of the catalytic reactor 40, wherein the chlorous acid is reacted with a catalytic material 46 disposed therein to form and produce an aqueous effluent containing chlorine dioxide from the outlet 44. In this manner, it has also been found that high conversion efficiencies of chlorite ions to chlorine dioxide may be achieved.

Within the acidification column 52, the alkali metal halite solution contacts a mixture of protic acids effective to acidify the alkali metal halite solution to produce an effluent comprising halous acid. The terms "mixture of protic acids" or "protic acid mixture" are interchangeable and generally refer to a mixture of substances wherein each substance independently produces hydrogen ions when contacted with water. The mixture of protic acids may comprise any protic acid with the proviso that a halide-containing protic acid is not used. While not wanting to be bound by theory, it is believed that halide-containing protic acids are undesirable in system 50 because their presence, especially in excess quantities, results in the formation of unwanted byproducts. For example, in the production of chlorine dioxide, when a chloride-containing protic acid is used, the presence of excess chloride-containing ions will oxidize the chlorine dioxide to unwanted chlorate ions, substantially reducing the amount of chlorine dioxide available over time. Also, the presence of excess chloride-containing ions can penetrate passivated films, such as the protective coating on stainless steel containers, resulting in accelerated corrosion of the stainless steel.

In one embodiment for producing chlorine dioxide, the protic acid mixture comprises a phosphorus-containing protic acid and a sulfur-containing protic acid. It has unexpectedly been found that using a phosphorus-containing acid in conjunction with a sulfur-containing acid is advantageous because, in addition to not producing any unwanted side products or having significant deleterious effects on initial chlorine dioxide yield, the combined presence of sulfur- and phosphorus-containing ions in solution increases the surface tension of the effluent, which is effective for retarding the escape of gaseous chlorine dioxide from the effluent over time. Preferred phosphorus-containing protic acids include hypophosphorous acid ($H_3PO_2$), phosphoric acid ($H_3PO_4$), perphosphoric acid ($H_3PO_5$), phosphorous acid ($H_3PO_3$), pyrophosphoric acid ($H_4P_2O_7$), metaphosphoric acid ($HPO_3$), and the like, or a combination comprising at least one of the foregoing phosphorus-containing protic acids. Preferred sulfur-containing protic acids include sulfuric acid ($H_2SO_4$), sulfurous acid ($H_2SO_3$), hydrogen sulfide ($H_2S$), persulfuric acid ($H_2SO_5$), hyposulfurous acid ($H_2SO_2$), and the like, or a combination comprising at least one of the foregoing sulfur-containing protic acids.

In an exemplary embodiment, the protic acids are $H_2SO_4$ and $H_3PO_4$. While not wishing to be bound by theory, it is believed that being a weak acid (i.e., it exists in solution as a mixture of non-, partially- and fully-dissociated species), $H_3PO_4$ advantageously provides a buffering effect that may be used to manipulate the pH of the product. It is known, for example, that at pH less than about 1, chlorine dioxide decomposes to form chloric acid ($HClO_3$) and hydrochloric acid (HCl); and at pH greater than about 8, chlorine dioxide hydrolyzes to form chlorate ($ClO_3^-$) and chlorite ($ClO_2^-$) ions. Thus, for the generation of chlorine dioxide, it is advantageous to have the pH of the effluent containing chlorine dioxide be between about 1 and about 8, more advantageously between about 1.5 and about 5, and most advantageously between about 2 and about 3. As $H_2SO_4$ is a strong acid, it completely dissociates in solution to provide sulfate ($SO_4^{2-}$) ions, which have essentially no effect on chlorine dioxide concentration, as well as hydrogen ($H^+$) or hydronium ($H_3O^+$) ions. The pH of the effluent containing chlorine dioxide can be controlled, in part, by the ratio of $H_3PO_4$ to $H_2SO_4$. For example, the ratio of $H_3PO_4$ to $H_2SO_4$ can be about 0.3 to about 5.0 for the pH of the effluent containing chlorine dioxide to be between about 1 and about 8, about 0.5 to about 3.2 for the pH of the effluent containing chlorine dioxide to be between about 1.5 and about 5, or about 0.7 to about 1.4 for the pH of the effluent containing chlorine dioxide to be between about 2 and about 3.

As previously discussed, the catalytic reactor 40 contains a catalytic material 46 for producing the halogen oxide from the halous acid feedstream originating from the cation exchange column 20 or the acidification column 52. As used herein, the terms "catalytic material" or "catalyst material" are interchangeable and refer to a support and an active metal catalyst. The catalyst material 46 may be in the form of granular particulates or a rigid body catalyst element, wherein granular particulates of the catalyst material are consolidated into a rigid body comprising a plurality of tortuous flow paths. Suitable processes and parameters for making the rigid body catalyst elements are disclosed in commonly assigned U.S. Provisional Patent Application Ser. No. 60/613,541, filed on Sep. 27, 2004, incorporated herein by reference in its entirety.

Preferably, the active metal catalyst is finely and discretely deposited onto the support. While not wanting to be bound by theory, it is believed that the active metal catalyst adsorbs hydrogen atoms without reacting with the hydrogen atoms, which form stable hydrides. Preferably, the active metal catalyst does not adsorb hydrogen atoms into its crystal lattice since this will decrease its catalytic activity. In a preferred embodiment, the active metal catalyst is a noble metal. While not wanting to be bound by theory, it is believed that the catalytic activity of the active metal is associated with crystal imperfections and the finely divided deposits help to increase the surface area as well as increase the number of active catalytic sites. Suitable active metal catalysts include, but are not limited to, ruthenium, platinum, palladium, osmium, iridium, rhodium, titanium, manganese, lead, zirconium, niobium, tantalum, tungsten, tin, and composites or mixtures or alloys or oxides of at least one of the foregoing metal catalysts. Preferably, the active metal catalyst is an oxide of a metal selected from the group consisting of ruthenium, platinum, palladium, osmium, iridium, and rhodium. More preferably, the active metal catalyst is a platinum oxide.

In another embodiment, the active metal catalyst is a combination of an oxide of ruthenium, platinum, palladium, osmium, iridium, rhodium or mixtures or alloys of at least one of the foregoing metals and a less active oxide of a metal including titanium, lead, manganese, zirconium, niobium, tantalum, tungsten, tin, or mixtures, or alloys of at least one of the foregoing metals. Preferably, the molar ratio of the active metal catalyst to the less active metal catalyst is of about 0.3:1 to about 100:1. More preferably, the molar ratio of the active metal catalyst to the less active metal catalyst is about 10:1.

Preparation of the catalyst material 46 generally includes contacting the support with a catalyst precursor to form the active metal catalyst sites, for example, a catalyst precursor salt. In one embodiment, a metal oxide precursor salt is dissolved in an aqueous solution including an alcohol, and the solution is coated onto the support. Suitable alcohols include methanol, ethanol, isopropanol, propanol, butanol, combinations including at least one of the foregoing alcohols, and the like. In a preferred embodiment, the metal oxide precursor salt is dissolved in isopropanol and deionized water solution. The amount of alcohol used in the solution is dependent on the solubility of the metal oxide precursor salt, wherein the volume fraction of alcohol in an aqueous solution is about 30 to about 90% (v/v), with about 40 to about 80% (v/v) preferred and with about 50 to about 60% (v/v) more preferred.

Depending on the desired properties, a solution of the metal oxide precursor salt may contain further additives, for example, ions that increase the solubility of the metal oxide precursor. Suitable ions include hydroxides, chlorides, phosphates, sulfates, ammonium, potassium, sodium, lithium or the like. Preferably, the additive is ammonium hydroxide. The weight fraction of additive in the solution is about 0.1 to about 10% (w/v), with about 0.5 to about 5% (w/v) preferred, and with about 1% (w/v) more preferred.

Alternatively, the metal catalyst may be deposited onto the support to form the catalyst material 46 using other techniques such as impregnation, co-precipitation, ion exchange, dipping, spray coating, vacuum deposition, sputtering, or the like. Preferably, the amount of metal catalyst deposited onto the support is about 0.01 to about 100 weight %, with about 0.01 to about 10 weight % more preferred, and with about 0.05 to about 2 weight % most preferred, based on the total weight of the catalyst material. In addition, it has been found that the catalyst activity of the catalyst material is improved with multiple depositions, i.e., the metal oxide precursor solution is applied by several individual depositions. Preferably, the number of depositions is about 2 to about 12, with the number of depositions of about 2 to about 3 more preferred.

The metal deposited onto the support by the precursor solution is then thermally or chemically oxidized to the oxide form. When utilizing a thermal process, adjusting the temperature can control the extent of oxidation. The support is preferably thermally stable to the oxidation temperatures employed. The oxidation temperatures are preferably about 200° C. to about 1000° C., with about 400° C. to about 800° C. more preferred, and with about 500° C. to about 700° C. even more preferred. Suitable chemical oxidants include permanganate. The extent of oxidation may be increased when a multiple deposition process is used in contrast to a single deposition process.

Removing the catalyst material 46 from the reactor 40 and thermally treating the catalyst material 46 can be used to periodically regenerate the catalyst material 46. For example, a catalyst material 46 comprising a ceramic support and platinum catalyst material can be regenerated by heating the material to about 550° C. for about 20 minutes, cooling to about room temperature, backwashing with water, mixing with a tetraamineplatinum (II) chloride solution, air drying, heating again to about 550° C. for about 20 minutes, backwashing and air drying. Alternatively, the catalyst material 46 may be regenerated by chemically treating the media.

Suitable supports for the catalyst material 46 include metals, zeolites, anthracite, glauconite, faujasite, mordenite, clinoptilolite, aluminas, silicas, clays, ceramics, carbon and the like. Of these supports, ceramics are most preferred. In a preferred embodiment, the catalyst materials are made from those ceramics described in U.S. Pat. Nos. 4,725,390 and 4,632,876, herein incorporated by reference in their entireties. Preferred ceramics are those made essentially from nonmetallic minerals (such as mineral clays) by firing at an elevated temperature. More preferred are ceramic materials commercially available under the trade name MACROLITE® by the Kinetico Company. The MACROLITE® ceramic materials are spherically shaped and characterized by having a rough texture, high surface area, and level of moisture absorption of less than about 0.5%. The low level of moisture absorption allows for the metal oxide precursor solution to penetrate a minimal depth into the surface of the ceramic, thereby depositing metal onto the external surface of the support, an optimum location for subsequent contact with an aqueous solution. The surface area of the MACROLITE® ceramic materials is believed to be on the order of about 103 m$^2$ per gram.

The process for making ceramic support materials, such as the MACROLITE® material, generally includes the following steps. In the first step, mineral particulate, binder, silicon carbide, and parting agent are mixed and spheroidized in order to form unfired spheroids. One example of mineral particulates contains: 60% orthoclase, 10% nepheline, 10% hornblende, 5% diopside, 15% accessory minerals (titanite, apatite, magnetite and biotite) and trace amounts of secondary minerals (e.g., kaolinite and analcite). Another example contains approximately 75% plagioclase and orthoclase feldspar and 25% of the minerals pyroxene, hornblende, magnetite and quartz of which magnetite is less than 5%. Byproduct mineral fines of perlite (containing 2–5% chemically bound water) will also function as the mineral particulates. Minerals containing chemically bound water or sulfur, which are useful components of the mineral particulates, are hornblende, apatite, biotite, pyrite, vermiculite and perlite.

Binders that may be useful as raw materials include bentonite, starch, polyvinyl alcohol, cellulose gum, polyvinyl acetate and sodium lignosulphonate. The amount of binder may generally comprise about 1 to about 5% by weight of the dry materials fed to the mixer and is generally sufficient to permit screening and handling of the spheroids without significant attrition or breakage.

Suitable parting agents include magnesium oxide, zircon, diaspore and high alumina clays as well as other surface metal oxides.

The spheroids are then dried at a temperature of about 40° C. to about 200° C. and typically screened. The ceramic spheroids are then over-fired in a kiln, which allows for the formation of the internal air cells, making the finished product less dense. The firing atmosphere is typically air. The silicon carbide in the spheroids is oxidized during firing, the SiC near the surface being more extensively oxidized than that in the core.

The product from the kiln is screened using standard methods known to those skilled in the art. Either before, during, or after the screening step, the fired spheroids may be subjected to vigorous agitation by air or some other agitation means or to a water-washing step in order to remove dust from their surfaces. The support material is then coated with an active metal catalyst in the manner previously described and then thermally or chemically oxidized to the oxide form.

The size of the cation exchange material 30 or catalyst material 46 is generally defined by a mesh size of a sieve in which the cation exchange material or catalyst material are screened. For example, a 30 mesh sieve will allow particles less than about 600 micrometers to pass through the sieve, whereas particles about 600 micrometers or larger than will not pass through. Generally, sieves of varying mesh ratings are stacked and particles are separated using methods well known to those skilled in the art. The range of particles separated is defined by the mesh size of the sieves used. For example, a mesh size designation of 20/40 means that substantially all particles have a size ranging from 20 to 40 mesh (about 841 to about 420 micrometers in diameter). A 30/50 designation indicates that substantially all particles have a size ranging from 30 to 50 mesh (about 595 to about 297 micrometers in diameter). The sizes of the cation exchange material 30 or catalyst material 46 are preferably smaller than 7 mesh (about 2800 micrometers in diameter), with smaller than 14 mesh (about 1400 micrometers in diameter) more preferred, and with smaller than 30 mesh (about 595 micrometers in diameter) even more preferred. Also preferred are particulate sizes greater than 60 mesh (about 250 micrometers in diameter), with greater than 50 mesh (about 297 micrometers in diameter) more preferred, and greater than 40 mesh (about 425 micrometers) even more preferred.

The flow rate through the cation exchange column 20, or acidification column 52, and/or the catalytic reactor 40 is preferably about 0.1 to about 0.2 bed volumes per minute. The minimum bed depth of each respective bed is preferably about 24 inches. The flow rate and minimum bed depth can be used to determine the dimensions of the cation exchange column 20, the acidification column 52, the catalytic reactor 40 and the volumes of cation exchange material 30, protic acid mixture, and catalytic material 46 employed.

The cation exchange material 30 and/or the catalytic material 46 are not intended to be limited to any particular shape. Suitable shapes include rods, extrudates, tablets, pills, irregular shaped particles, spheres, spheroids, capsules, discs, pellets or the like. In a preferred embodiment, the catalytic material is spherical. Preferably, the catalytic material 46 includes a reticulated and textured surface having an increased surface area. The sizes and shapes of the cation exchange material 30 or catalyst material 46 employed in system 10 are dependent on the acceptable pressure drop across the respective bed. Generally, the smaller the catalytic material 46 or cation exchange material 30, the greater the pressure drop.

In operation of system 10, a dilute alkali metal halite solution will be introduced into the inlet 22 of the cation exchange column 20. The alkali metal ions will be adsorbed and exchanged with hydrogen ions by the cation exchange material 30 to produce a halous acid effluent from outlet 24. The halous acid effluent is then fed to the inlet 42 of the catalytic reactor 40, wherein the halous acid is catalytically oxidized to produce a halogen oxide effluent. Flow is continued until alkali metal ion leakage is detected in the effluent from the cation exchange column 20. Alkali metal ion leakage is an indication that the cation exchange material is becoming or has become exhausted. That is, a majority of the cationic active sites are in the alkali metal form as opposed to the hydrogen form. The cation exchange material 30 can be regenerated upon addition of a protic acid (also referred to herein as the regenerant). The terms "protic acid" or "regenerant" refer to substances that produce hydrogen ions when added to water, e.g., a substance that dissociates or ionizes to produce hydrogen ions when added to water.

Figure 3:
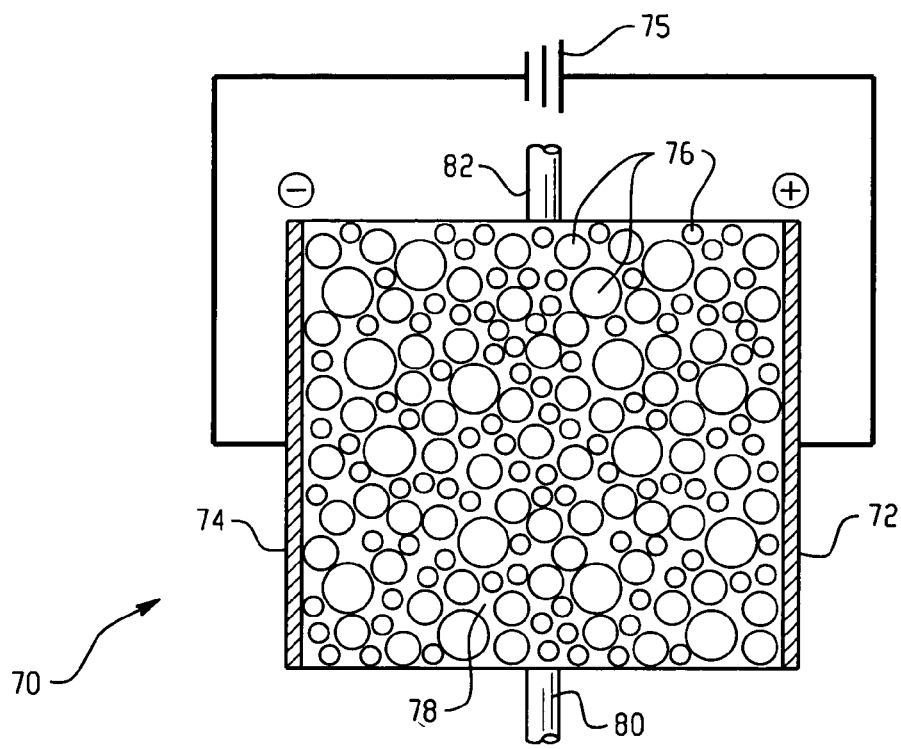
FIG. 3 shows a cross sectional view illustrating the a single compartment electrolytic reactor.
Figure 4:
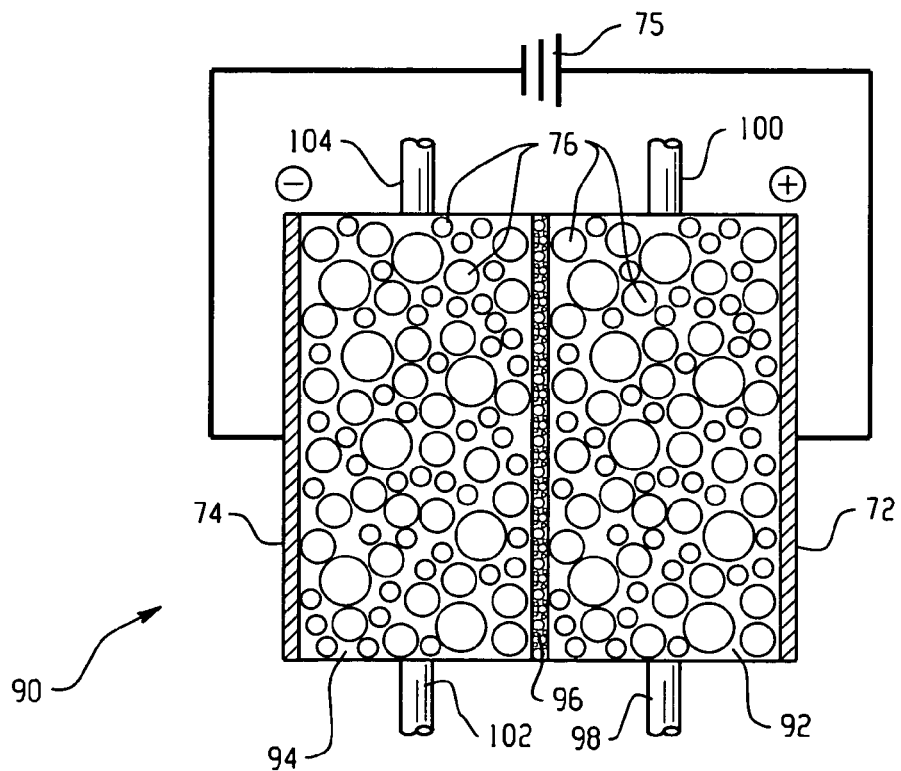
FIG. 4 shows a cross sectional view illustrating a two-compartment electrolytic reactor.
Figure 5:
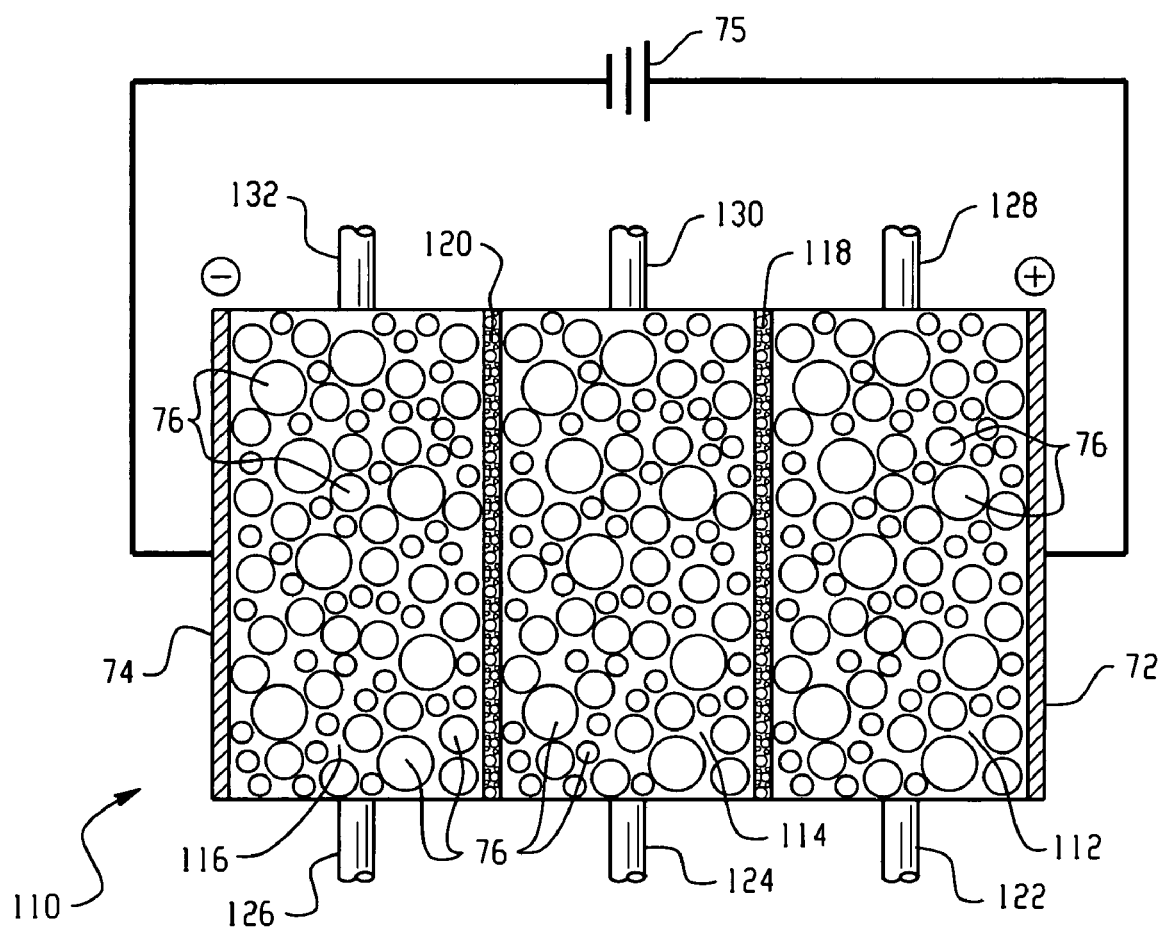
FIG. 5 shows a cross sectional view illustrating an multi-compartment electrolytic reactor.

As previously discussed and shown in FIG. 2, the cation exchange column 20 is regenerated with the addition of a protic acid. In one embodiment the regenerant is produced electrolytically. Suitable electrolytic reactors 60 for use in system 10 include a single compartment reactor 70 as shown in FIG. 3, a two-compartment reactor 90 as shown in FIG. 4, or a multi-compartment reactor, i.e., a reactor containing three or more compartments. An exemplary multi-compartment electrolytic reactor 110 configured with three compartments is shown in FIG. 5.

Referring now to FIG. 3, the single compartment electrolytic reactor 70 includes an anode 72 and a cathode 74 in electrical communication with a source of direct current 75 (DC). Interposed between the anode 72 and the cathode 74 exists at least one compartment 78 containing particulate material 76. Compartment 78 further includes an inlet 80 for introducing the acid precursor solution to the electrolytic reactor 70, and an outlet 82 for discharging an effluent containing a protic acid from the electrolytic reactor 70. Suitable acid precursor solutions include alkali metal salts of sulfates, sulfites, sulfides, nitrates, nitrites, phosphates, halides, and the like. During operation of the electrolytic reactor 70, the acid precursor is converted to the corresponding protic acid. For example, sodium chloride is converted to hydrogen chloride. Likewise, sodium sulfate is converted to sulfuric acid.

As used herein, the term "particulate material" refers to a cation exchange material and/or an anion exchange material. In a preferred embodiment, the particulate material 76 in compartment 78 includes the same cation exchange material as disposed in the cation exchange column 20 or a mixture of the same or different cation exchange material and the anion exchange material. In the case of mixtures of the cation and anion exchange materials, the majority of the particulate material 76 within compartment 78 is preferably the cation exchange material. The particulate material 76 may also include an additive or additives to achieve certain results. For example, electrically conductive particles, such as carbon and the like, can be used to affect the transfer of DC current across the electrodes. However, some additives, such as carbon, are prone to disintegration in acidic environments, thus requiring careful selection.

As shown in FIG. 4, the two-compartment electrolytic reactor 90 includes an anode 72, an anode compartment 92, a cathode 74, and a cathode compartment 94, wherein the anode 72 and cathode 74 are in electrical communication with a source of direct current 75 (DC). A membrane 96 preferably separates the anode compartment 92 from the cathode compartment 94. The anode compartment 92 further includes inlet 98 and outlet 100. Similarly, the cathode compartment 94 includes inlet 102 and outlet 104.

As used herein, the term "membrane" generally refers to a sheet for separating adjacent compartments, e.g., compartments 92 and 94. In this regard, the term "membrane" can be used interchangeably with screen, diaphragm, partition, barrier, a sheet, a foam, a sponge-like structure, a canvas, and the like. The membrane 96 can be chosen to be permselective, e.g., a cation exchange membrane, or can be chosen to be non-permselective, e.g., a porous membrane. As used herein, the term "permselective" refers to a selective permeation of commonly charged ionic species through the membrane with respect to other diffusing or migrating ionic species having a different charge in a mixture. In contrast, the term "non-permselective" generally refers to a porous structure that does not discriminate among differently charged ionic species as the species pass through the porous structure, i.e., the membrane is non-selective with respect to ionic species. For example, in a permselective membrane such as a cation exchange membrane, cations can freely pass through the membrane whereas the passage of anions is prevented. In contrast, in a non-permselective membrane such as a porous membrane, both anions and cations can freely pass through the porous membrane.

At least one of the compartments 92 or 94 of electrolytic reactor 90, contains the particulate material 76, and is configured to receive an aqueous acid precursor feed solution. If both compartments contain particulate material 76, each compartment 92, 94 may be configured to possess its own physical properties (e.g., the particulate material 76 in the cathode compartment 94 may have different properties from the particulate material 76 disposed in the anode compartment 92) through which an aqueous solution can pass without entering adjacent compartment 92. Preferably, the particulate material 76 in the compartment 92 and/or 94 in which the acid precursor feed solution is fed comprises the cation exchange material in the hydrogen form or a mixture of the cation exchange material in the hydrogen form and anion exchange material, wherein the majority of the particulate material 76 is the cation exchange material.

In a preferred embodiment, the anode and cathode compartments 92, 94, respectively, are preferably packed with the cation exchange material, and the membrane 96 separating the anode compartment 92 from the cathode compartment 94 is a cation exchange membrane. In this configuration of the two-compartment reactor 90, the acid precursor feed solution can be fed to either or both compartments to provide an effluent containing a protic acid, which is then fed to the cation exchange column 20 for regeneration or to a storage tank (not shown) for later use.

Referring now to FIG. 5, the three-compartment electrolytic reactor 110 generally comprises an anode compartment 112, a central compartment 114, and a cathode compartment 116. The central compartment 114 is interposed between the anode and cathode compartments 112, 116, respectively, and is separated therefrom by membranes 118 and 120. Each compartment 112, 114, and 116, preferably includes inlets 122, 124, 126, respectively, and outlets 128, 130 and 132, respectively. The anode compartment 112 includes anode 72 and can be optionally filled with the particulate material 76. The cathode compartment 116 includes cathode 74 and can be optionally filled with the particulate material 76. The anode 72 and cathode 74 are in electrical communication with a source of direct current 75 (DC).

In a preferred embodiment, the central compartment 114 comprises particulate material 76, wherein the particulate material 76 comprises the cation exchange material or a mixture of cation exchange material and anion exchange material as previously described, wherein the majority of the particulate material 76 is the cation exchange material in the hydrogen form. In addition, the electrolytic reactor membrane 118 is preferably a cation exchange membrane.

Figure 6A:
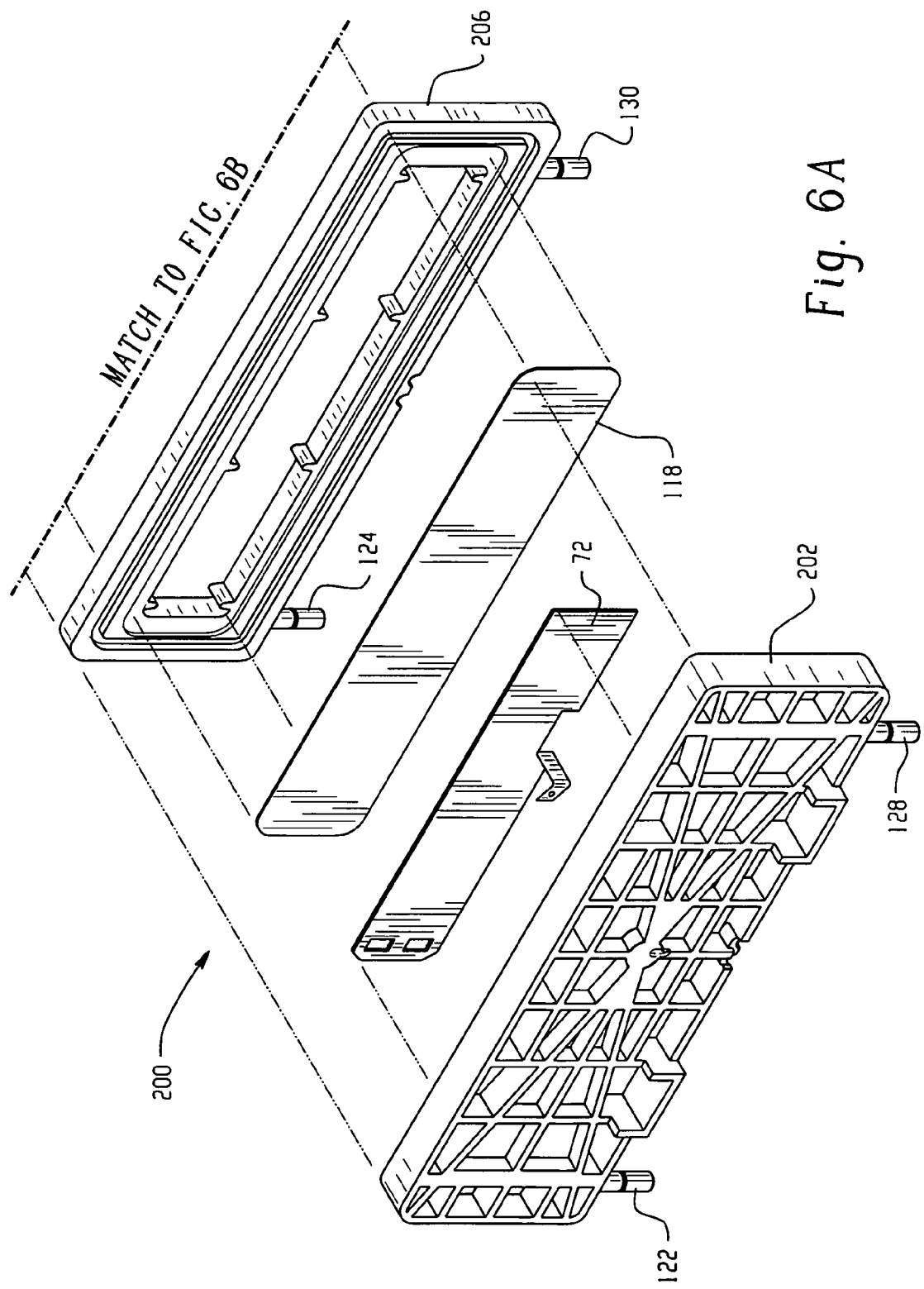
FIGS. 6A and 6B show an exploded isometric view of an electrolytic reactor cassette employing the multi-compartment reactor of FIG. 5.
Figure 6B:
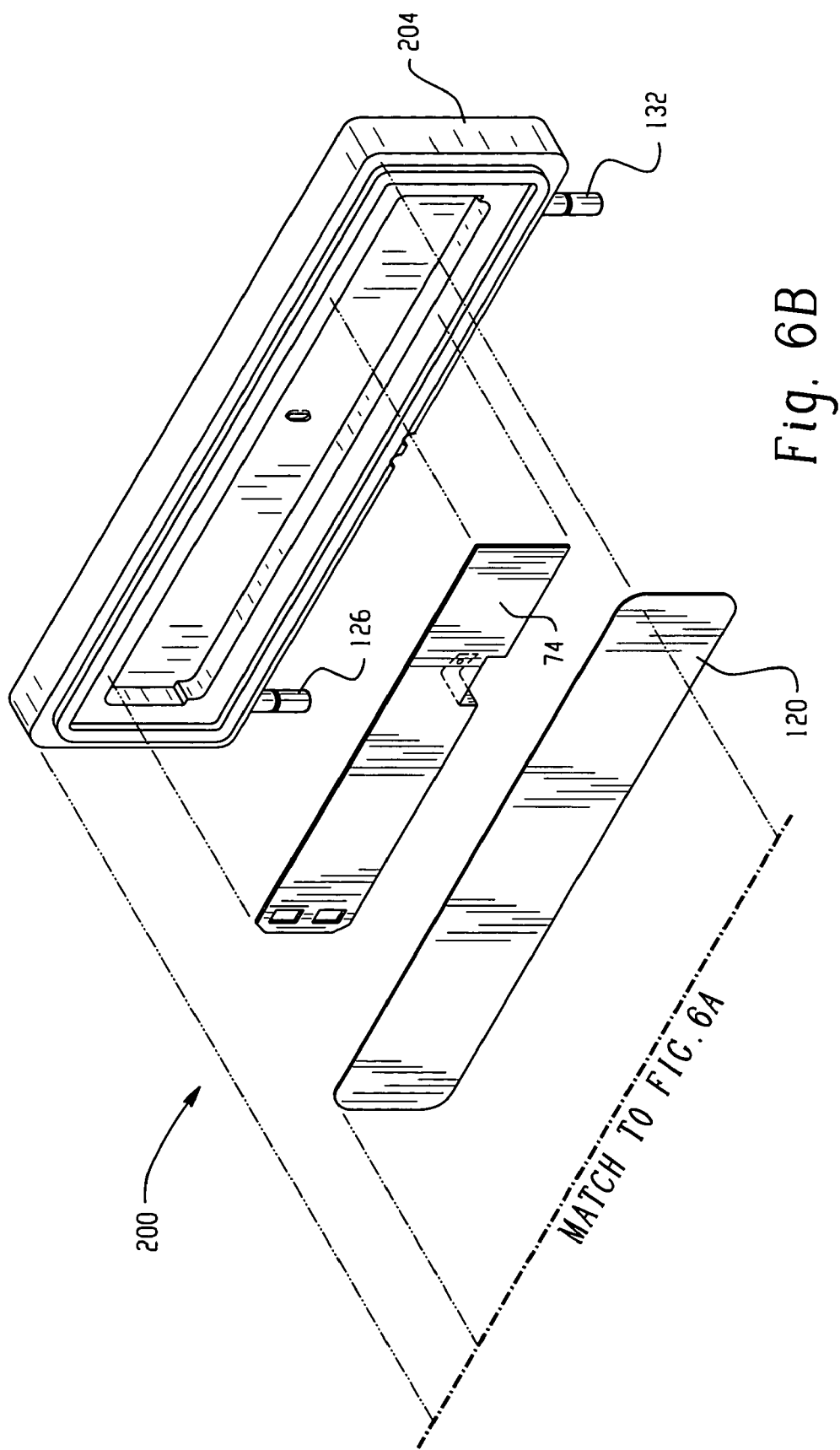

Referring now to FIGS. 6A and 6B, there is shown an exploded isometric view of an exemplary electrolytic reactor cassette 200 employing the three-compartment reactor configuration 110 as described in relation to FIG. 5. The cassette 200 is formed from stock materials that are preferably chemically inert and non-conductive. Components forming the cassette 200 may be molded for high volume production or alternatively, may be machined as described in further detail below.

The exemplary cassette 200 is configured is fabricated from two pieces of flat stock 202 and 204, about 4 inches across by about 14 inches long by about 1 inch thick. The pieces 202, 204 are machined such that depressions ¼ inch deep by 2 inches across by 12 inches long are cut in the center of each piece. The pieces 202, 204 are then drilled and tapped to accept the anode 72 and cathode 74. Each piece further includes inlets 122, 126 and outlets 128, 132, respectively, through which fluid would flow. The anode 72 and cathode 74 are approximately 2 inches across by 9 inches long and are inserted into the stock pieces 202 and 204. Membranes 118, 120 are disposed over each depression formed in stock pieces 202, 204. Preferably, membrane 118 is a cation exchange membrane. Approximately 100 ml of particulate material (not shown) may optionally be packed into each depression to form the anode compartment 112 and the cathode compartment 116, respectively (as shown in FIG. 5). As constructed, the particulate material, if present in the cathode and/or anode compartments, is configured to be in direct contact with the anode 72 or cathode 74.

Interposed between the membranes 118, 120 is a piece of flat stock 206, about 4 inches across by about 14 inches long by 1 inch thick. The stock piece 206 is machined such that a hole about 2 inches across by 12 inches long is cut through the piece to form the central compartment 114 (as shown in FIG. 5). The piece 206 is then drilled and tapped to accept two fittings that form inlet 124 and outlet 130 through which fluid would flow. The central compartment 114 is filled with about 150 ml of particulate material that includes the cation exchange material. The components of the electrolytic reactor cassette 200 are assembled and bolted together, or otherwise secured. In this configuration, the acid precursor solution is preferably passed through the central compartment 114 and is not in direct contact with the anode 72 or cathode 74.

In a preferred embodiment, the cassettes 200 are formed from an acrylonitrile-butadiene-styrene (ABS) terpolymer. Other suitable materials include, but are not intended to be limited to, polyvinylchloride (PVC), chlorinated PVC, polyvinylidene difluoride, polytetrafluoroethylene and other fluoropolymer materials.

While the arrangements of the electrolytic reactors 70, 90, and 110 illustrated in FIGS. 3, 4, and 5 are presently considered preferable for use in system 10, any arrangement in which a sufficient quantity of cation exchange resin or material is packed between the anode and cathode in an electrolytic reactor or in at least one of the compartments of a divided or multi-compartment electrolytic reactor can be used.

The anode 72 and the cathode 74 may be made of any suitable material based primarily on the intended use of the electrolytic reactor, costs, and chemical stability. For example, the anode 72 may be made of a conductive material, such as ruthenium, iridium, titanium, platinum, vanadium, tungsten, tantalum, oxides of at least one of the foregoing, combinations including at least one of the foregoing, and the like. Preferably, the anode 72 comprises a metal oxide catalyst material disposed on a suitable support. The supports are typically in the form of a sheet, screen, or the like and are formed from a rigid material such as titanium, niobium, and the like. The cathode 74 may be made from stainless steel, steel or may be made from the same material as the anode 72.

The permselective membranes, e.g., 96, 118, and 120, preferably contain acidic groups so that ions with a positive charge can be attracted and selectively passed through the membrane in preference to anions. Preferably, the permselective membranes contain strongly acidic groups, such as $R-SO_3^-$ and are resistant to oxidation and temperature effects. In a preferred embodiment, the permselective membranes are fluoropolymers that are substantially chemically inert to acids, acids precursors, or the environment used to produce the acids. Examples of suitable permselective membranes include perfluorosulfonate cation exchange membranes commercially available under the trade name NAFION commercially available from E.I. duPont de Nemours, Wilmington, Del.

In an application for generating chlorine dioxide as shown schematically in FIG. 7, the exemplary system 10 is configured with the three-compartment electrolytic reactor 110 as previously described to periodically provide a regeneration solution to the cation exchange column 20 or to a storage tank (not shown). A dilute alkali metal halite solution is fed into the cation exchange column 20 to produce a halous acid effluent. The halous acid effluent is then fed to the catalytic reactor 40 to catalytically oxidize the halous acid to a halogen oxide. In a preferred embodiment, the alkali metal halite is sodium chlorite, which produces a chlorous acid effluent from the cation exchange column 20. The chlorous acid effluent is then catalytically oxidized to produce a chlorine dioxide effluent from the catalytic reactor 40.

During regeneration, an aqueous feed solution of an acid precursor solution, e.g., sodium chloride, is preferably passed through the central compartment 114, wherein the alkali metal ions are exchanged with hydrogen ions in the cation exchange material to produce a protic acid within the central compartment 114. Water preferably flows through the anode compartment 112. Preferably, the water is deionized. As a direct current is applied to the electrolytic reactor 110, the anode compartment 112 electrolyzes the water to generate, among others, hydrogen ions. The hydrogen ions generated in the anode compartment 112 can diffuse across the cation exchange membrane 118 into the central compartment 114 to acidify the acid precursor to produce the protic acid. The protic acid containing effluent from the reactor 110 is then fed to cation exchange column 20 for regeneration or to a storage tank (not shown) for regeneration at a later time. It should be noted that upon passing the protic acid through the cation exchange column 20, the effluent produced from the regeneration can advantageously fed back to the electrolytic reactor to produce the protic acid. Unlike prior processes, no treatment of the regeneration effluent is required since the effluent can be stored for later use during the next regeneration cycle.

The effluent from the anode compartment, primarily comprising water, is fed to the cathode compartment 116. The cathode compartment 116 electrolyzes the water to generate, among others, hydroxyl ions, which combines with alkali metal ions to produce an alkali metal hydroxide effluent.

In operation of system 50, a dilute alkali metal halite solution will be introduced into inlet 22 of the acidification column 52, wherein it will be acidified, after contact with a mixture of protic acids, to produce a halous acid effluent from outlet 24. The halous acid effluent is then fed to the inlet 42 of catalytic reactor 40, wherein the halous acid is catalytically oxidized to produce a halogen oxide effluent. The mixture of protic acids can be introduced into the acidification column prior to, contemporaneously with, or subsequent to the introduction of the alkali metal halite solution. Optionally, each acid in the mixture of protic acids may be introduced into the acidification column independently from each other and/or at independent times. The mixture of protic acids may be introduced into the acidification column 52 via inlet 22, a separate inlet 28 as shown in FIG. 8, or one inlet for each of the protic acids in the mixture of protic acids (not shown). In order to facilitate contacting of the mixture of protic acids and the alkali metal halite solution, at least a portion of acidification column 52, inlet 22, and/or inlet 28 may comprise an optional mixing device (not shown), such as a static mixer, electromagnetic or electromechanical stirrer, shear blade, packing material, or other suitable mixing device as known to those skilled in the art. The packing material may by any material that can generate turbulent flow, for increased mixing, of the contents in the acidification column 52.

In one exemplary embodiment, the mixture of protic acids, which has been previously prepared, and the alkali metal halite solution are introduced into the acidification column 52 at substantially the same time, and the acidification column 52 is a vacant column whose internal diameter and height is such that convective transport is reduced with respect to diffusive transport. For example, the internal diameter may be about 1 to about 20 centimeters (cm) with a height of about 1 to about 80 cm. It is important to note that the shape of the acidification column is not critical, and may be rectangular, square, oblong, or any other shape.

In another exemplary embodiment, the mixture of protic acids, which has been previously prepared, and the alkali metal halite solution are introduced into the acidification column 52 at substantially the same time, and the acidification column 52 is a static mixer.

The concentration of halous acid produced in the cation exchange column 20, or the acidification column 52, is preferably less than about 6.0 grams per liter (g/L), with less than about 3 g/L more preferred and less than about 0.65 g/L even more preferred. Also preferred is a halous acid concentration greater than about 0.06 g/L, with greater than about 0.3 g/L more preferred and greater than about 0.5 g/L even more preferred. At concentrations greater than about 6.0 g/L, there is an increased risk of producing some halogen oxides in the vapor phase, which undesirably can cause an explosion referred to by those skilled in the art as a "puff". For example, chlorine dioxide is known for its potential to explode at high concentrations.

The applied current to the reactor 70, 90, 110 should be sufficient to electrolyze water and form hydrogen ions at the anode 72 in an amount effective to protonate the acid precursor. The alkali metal ions from the acid precursor solution can diffuse through membrane 120 to the cathode compartment 116 and with the hydroxyl ions produce an alkali metal hydroxide effluent from the cathode compartment 132. The amount of protic acid produced in this manner is preferably about 100 to about 500 percent in excess of the theoretical capacity of the cation exchange material 30 in the cation exchange column 20.

There are a number of variables that may be optimized during operation of the systems 10 and 50. For example, the space-time, of the alkali metal chlorite solution with the cation exchange material 30, also referred to as contact time, is preferably less than about 20 minutes and more preferably, less than about 2 minutes. The space-time or contact time of the alkali metal chlorite solution with the mixture of protic acids through the acidification column 52 is preferably less than about 20 minutes, and more preferably less than about 2 minutes. Also preferred is a space-time greater than about 0.1 minutes, with greater than about 0.3 minutes more preferred. Similarly, the space-time of the chlorous acid containing effluent with the catalytic material 46 is preferably less than about 20 minutes and more preferably less than about 2 minutes. Also preferred is a space-time greater than about 1 minute, with greater than about 0.1 minute more preferred. As used herein, the term "space-time" refers to the time necessary for a fluid to pass into and out of the cation exchange column and/or catalytic reactor.

In systems 10 employing an optional electrolytic reactor 60 for bed volume regeneration of the cation exchange column 20, a current density is preferably maintained at about 5 to about 100 milliAmps per square centimeter (mA/cm$^2$). More preferably, the current density is less than about 50 mA/cm$^2$, with less than about 35 mA/cm$^2$ even more preferred. Also preferred, are current densities greater than about 10 mA/cm$^2$, with greater than about 25 mA/cm$^2$ more preferred. The temperature at which the feed solutions (e.g., acid precursor solution, water, and the like solutions) is maintained can vary widely. Preferably, the temperature is less than about 50° C., with less than about 35° C. more preferred and with less than about 25° C. even more preferred. Also preferred is a temperature greater than about 2° C., with greater than about 5° C. more preferred, and with greater than about 10° C. even more preferred. In a preferred embodiment, the process is carried out at about ambient temperature.

The pressure drop through the cation exchange column 20, the acidification column 52, the catalytic reactor 40, or the optional electrolytic reactor 60, is preferably less than about 20 pounds per square inch (psi) and for most applications, with less than about 10 psi more preferred. Also preferred is a pressure drop greater than about 0.1 psi, and for most applications, with greater than about 1 psi more preferred. Further optimization for any of these process variables is well within the skill of those in the art in view of this disclosure.

Advantageously, the systems and processes disclosed herein provide a highly efficient process for generating halogen oxide. The use of a cation exchange resin or a mixture of protic acids provides a substantially purified solution of halous acid, which is then fed to the catalytic reactor to produce stoichiometric quantities of the halogen oxide, e.g., chlorine dioxide. Moreover, the systems and processes described herein may provide reduced waste streams. Cation exchange materials are generally difficult to regenerate and may need more regenerant than a stoichiometric quantity. As such, previously described processes employing cation exchange materials can produce large quantities of waste solutions, which must be properly disposed of. With the use of the optional electrolytic reactor, the regeneration effluent solution can be stored in a storage tank until the next regeneration cycle, wherein it can be passed through the electrochemical cell to generate a strong acid suitable for regeneration. Moreover, catholyte flow rate in the electrochemical cell can be controlled such that the volume of waste solution can be reduced.

The invention is further illustrated by the following non-limiting examples.

In these examples, the following parameters were recorded: chlorine dioxide flow rate, concentration, pH, and temperature as well as sodium chlorite and protic acid flow rates.

A properly calibrated Direct Reading Spectrophotometer, Model No. DR/2010, was used to measure the chlorine dioxide concentration (mg/L) in the catalytic reactor effluent solution using Hach Company Method 8138. Measurement of the yield provided a standard for evaluating actual performance of the process/system and was determined in accordance with the following mathematical relationship:

$$\%Yield = \frac{actual}{theoretical} \times 100$$

wherein the actual yield was obtained from the amount of chlorine dioxide generated, and wherein the theoretical yield was calculated by the amount of chlorine dioxide that could be generated from the concentration of the sodium chlorite in the starting solution. Since five moles of chlorite ions are required to produce 4 moles of chlorine dioxide, based on the following checmical reaction:

$$5NaClO_2 + 4HCl \rightarrow 4ClO_2 + 5NaCl + 2H_2O$$

the theoretical yield was calculated using the following mathematical relationship:

$$\%TheoreticalYield = \frac{[ClO_2]_{product}}{\left[\frac{4}{5}\right][NaClO_2]_{feed}\left[\frac{90.5}{67.5}\right]} \times 100$$

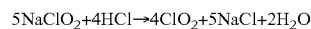

wherein the term (90.5/67.5) is the ratio of the equivalent molar weights of sodium chlorite to chlorine dioxide. Further, in these examples, supported a supported platinum oxide catalysts were used. The catalyst was prepared on a spherical ceramic support (Macrolite ML1430, Kinetico Inc.) with a particle size of about 0.6 to 1.4 millimeters (mm). To place the platinum on the surface of the ceramic support, a 37 milliliter (mL) precursor solution was made by dissolving 1.1 grams of tetraamineplatinum (II) chloride crystals in 1.0 mL of 30% ammonia hydroxide and 36 mL of 60% isopropyl alcohol at 35° C., such that the solution contained 0.6 grams of platinum. The precursor solution was then sprayed in a fine mist onto the surface of 250 cubic centimeters (cm$^3$) of ceramic support so as to form an even coating on the surface of the support. The coated ceramic support was dried, placed in a ceramic crucible, and calcined in an oxygen-containing environment at 450° C. for 60 minutes. Unless stated otherwise, the quantity of platinum on the support was about 0.5% by weight.

EXAMPLE 1

The flow rate through the acidification column and catalytic reactor, or catalyst element, was controlled by a needle valve. Two peristaltic pumps were used to independently inject a 25% sodium chlorite solution and the protic acid mixture solution, which included 18.5% $H_2SO_4$ and 11.8% $H_3PO_4$, into the acidification column.

The acidification column was a vacant column 11 inches in height and 1 inch in diameter and the catalytic reactor, which included a granular catalytic material, was 24 inches in height and 1 inch in diameter. Table 1 displays the results after 10 hours of operation.

TABLE 1

| | |
|---|---|
| $NaClO_2$ flow rate (mL/min) | 0.39 |
| Protic acid mixture flow rate (mL/min) | 0.39 |
| $ClO_2$ concentration (ppm) | 337 |
| $ClO_2$ pH | 2.54 |
| $ClO_2$ temperature (° C.) | 17.0 |
| $ClO_2$ flow rate (mL/min) | 198 |
| % yield $ClO_2$ | 94.9 |

EXAMPLE 2

Similar to Example 1 above, the flow rate through the acidification column and catalytic reactor was controlled by a needle valve. Two peristaltic pumps were used to independently inject a 25% sodium chlorite solution and the protic acid mixture solution, which included 18.5% $H_2SO_4$ and 11.8% $H_3PO_4$, into the acidification column.

The acidification column was a vacant column 13 inches in height and 2.5 inches in diameter and the catalytic reactor, which included a granular catalytic material, was 24 inches in height and 2.5 inches in diameter. Table 2 displays the results after 10 hours of operation.

TABLE 2

| | |
|---|---|
| $NaClO_2$ flow rate (mL/min) | 6.80 |
| Protic acid mixture flow rate (mL/min) | 6.80 |
| $ClO_2$ concentration (ppm) | 658 |
| $ClO_2$ pH | 2.15 |
| $ClO_2$ temperature (° C.) | 19.4 |
| $ClO_2$ flow rate (mL/min) | 1798 |
| % yield $ClO_2$ | 96.9 |

As evidenced in Examples 1 and 2, under varying conditions, the $ClO_2$ yields are high with the protic acid mixture. When the amount of convective fluid transport, which is influenced by the ratio of internal diameter to flow rate, is reduced relative to the amount of diffusive fluid transport, increased mixing of the sodium chlorite and protic acid mixture solutions occurred. This enabled a larger quantity of $ClO_2$ to be generated in the same amount of time while maintaining the high $ClO_2$ yield.

COMPARATIVE EXAMPLE 3

The flow rate through the acidification column and catalytic reactor was controlled by a needle valve. Two peristaltic pumps were used to independently inject a 25% sodium chlorite solution and an acid-containing solution into the acidification column. In one experiment the acid-containing solution was a 32% HCl solution, and in another experiment the acid-containing solution was a protic acid mixture solution, which included 24% $H_2SO_4$ and 9% $H_3PO_4$.

The acidification column was a vacant column 10 inches in height and ½ inch in diameter and the catalytic reactor, which included a granular catalytic material, was 10 inches in height and 2.5 inches in diameter. In this example, the quantity of platinum on the support was about 0.35% by weight. Table 3 displays the results after 53 hours of operation.

TABLE 3

| Acid-containing solution | HCl | Protic Acid Mixture |
|---|---|---|
| $NaClO_2$ flow rate (mL/min) | 0.59 | 0.59 |
| Acid-containing solution flow rate (mL/min) | 0.56 | 0.56 |
| $ClO_2$ concentration (ppm) | 474 | 568 |
| $ClO_2$ pH | 1.98 | 2.31 |
| $ClO_2$ temperature (° C.) | 18.3 | 17.4 |
| $ClO_2$ flow rate (mL/min) | 176 | 159 |
| % yield $ClO_2$ | 78.4 | 84.9 |

It is clear from the data in Table 3 that, under similar processing conditions, it can be advantageous to use a protic acid mixture instead of a chloride-containing acid in the acidification column.

COMPARATIVE EXAMPLE 4

Two $ClO_2$ solutions were prepared according to the procedure described in Example 3, with the exception that the catalytic material was a solid catalyst element. The solutions were placed in 500 mL amber bottles, which were filled to approximately 75% of their volume capacity and stored at ambient temperature (i.e., about 72° F.). The $ClO_2$ concentration in each bottle was monitored spectrophotometrically once a week for 9 weeks to determine the effect of the acid-containing solution used in the acidification column on chlorine dioxide stability. These results are shown graphically in FIG. 9.

Figure 9:
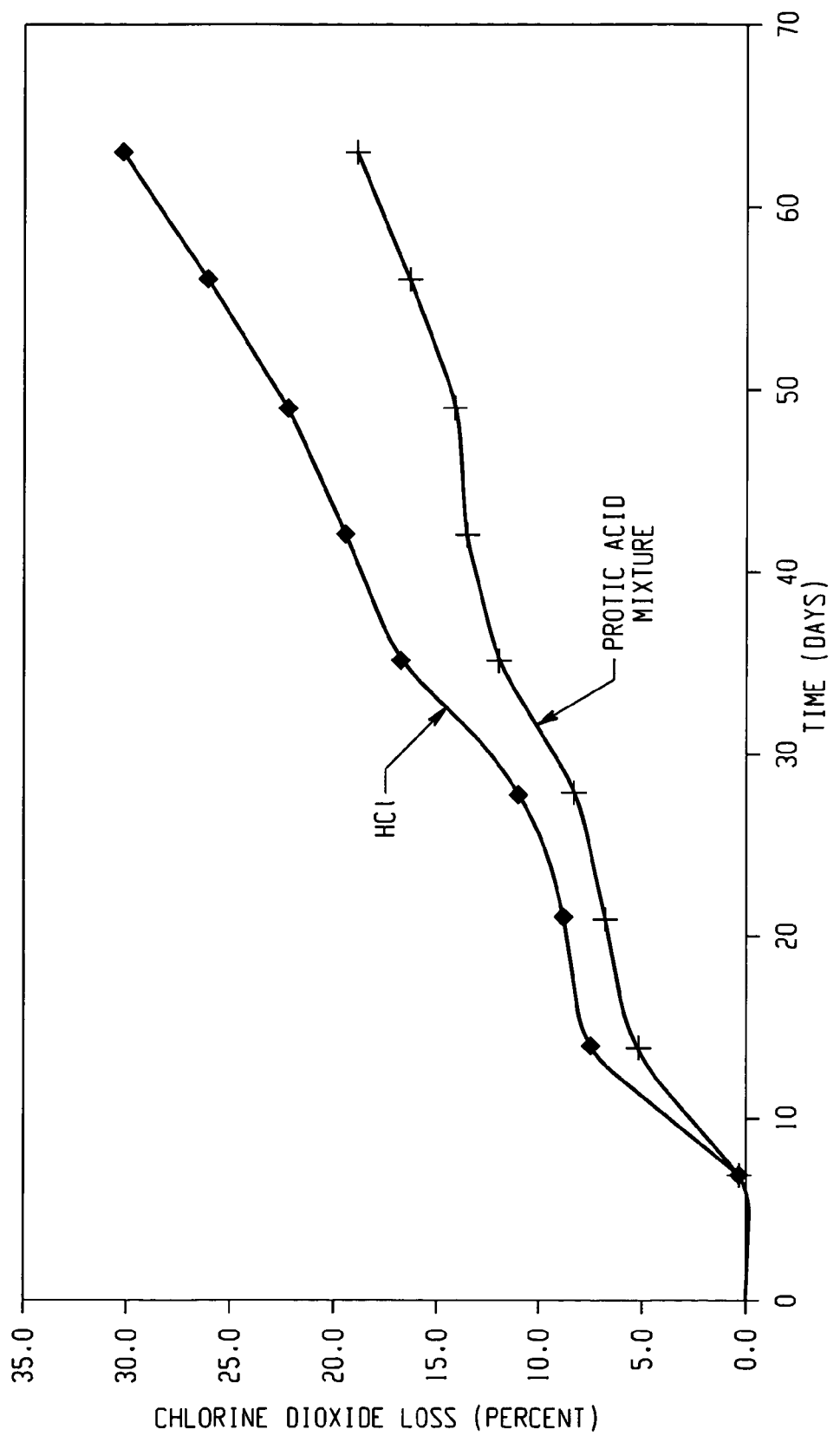
FIG. 9 is a graphical comparison of the dependence of the acid used in the acidification column on chlorine dioxide storage over time.

It has unexpectedly been found, as shown by the data trend in FIG. 9, that as time increased the chlorine dioxide stability was greater for a system using a protic acid mixture than for one using a chloride-containing acid. After nine weeks, the advantageous effects of the protic acid mixture resulted in 11.2% less chlorine dioxide loss, which translates into 37% greater stability.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the disclosure without departing from the essential scope thereof, such as for producing other halogen oxides. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A process for producing a halogen oxide, the process comprising:
   mixing a dilute aqueous alkali metal halite solution with a mixture of protic acids to produce an effluent containing a halous acid, wherein the mixture of protic acids does not comprise a halide-containing acid, and wherein the mixture of protic acids comprises a sulfur-containing protic acid and a phosphorus-containing acid; and
   contacting the effluent containing the halous acid with a catalytic material to produce the halogen oxide.

2. The process of claim 1, wherein a concentration of halous acid produced after mixing is less than about 6.0 grams per liter.

3. The process of claim 1, wherein the dilute alkali metal halite solution consists essentially of a dilute alkali metal chlorite solution.

4. The process of claim 3, wherein the dilute alkali metal chlorite solution is a dilute sodium chlorite solution.

5. The process of claim 1, wherein the phosphorus-containing protic acid is hypophosphorous acid, phosphoric acid, perphosphoric acid, phosphorous acid, pyrophosphoric acid, metaphosphoric acid, or a combination comprising at least one of the foregoing phosphorus-containing protic acids.

6. The process of claim 1, wherein the sulfur-containing protic acid is sulfuric acid, sulfurous acid, hydrogen sulfide, persulfuric acid, hyposulfurous acid, or a combination comprising at least one of the foregoing sulfur-containing protic acids.

7. The process of claim 1, wherein the mixture of protic acids consists of phosphoric acid and sulfuric acid.

8. The process of claim 1, wherein the catalytic material comprises a catalytic metal oxide and a ceramic support.

9. A process for producing chlorine dioxide comprising:
mixing a dilute alkali metal chlorite solution with a mixture of protic acids to produce an effluent containing a chlorous acid, wherein the mixture of protic acids does not comprise a halide-containing acid, and wherein the mixture of protic acids comprises a sulfur-containing protic acid and a phosphorus-containing protic acid; and
contacting the effluent containing the chlorous acid with a catalytic material to produce the chlorine dioxide.

10. The process of claim 9, wherein the phosphorus-containing protic acid is hypophosphorous acid, phosphoric acid, perphosphoric acid, phosphorous acid, pyrophosphoric acid, metaphosphoric acid, or a combination comprising at least one of the foregoing phosphorus-containing protic acids.

11. The process of claim 9, wherein the sulfur-containing protic acid is sulfuric acid, sulfurous acid, hydrogen sulfide, persulfuric acid, hyposulfurous acid, or a combination comprising at least one of the foregoing sulfur-containing protic acids.

12. The process of claim 9, wherein the mixture of protic acids consists of phosphoric acid and sulfuric acid.

13. The process of claim 9, wherein the catalytic material comprises a catalytic metal oxide and a ceramic support.

* * * * *